Figure 3:
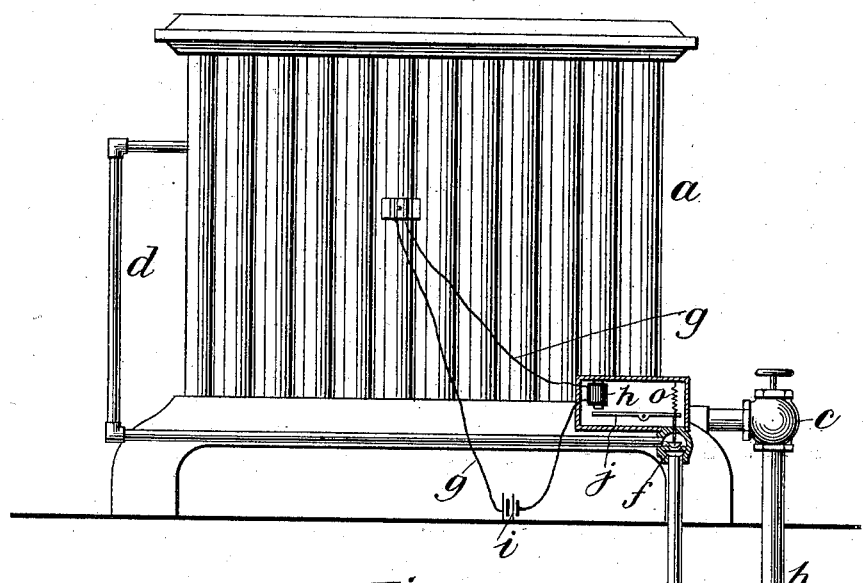

No. 647,026. Patented Apr. 10, 1900.
A. G. PAUL.
HEATING SYSTEM.
(Application filed July 6, 1897.)
(No Model.) 3 Sheets—Sheet 1.
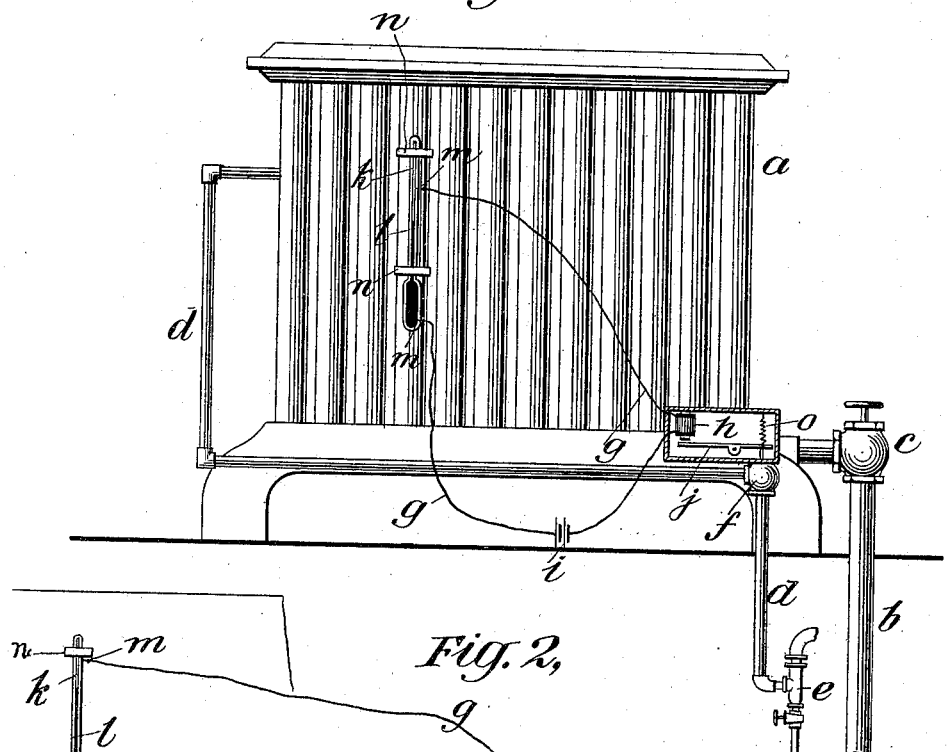
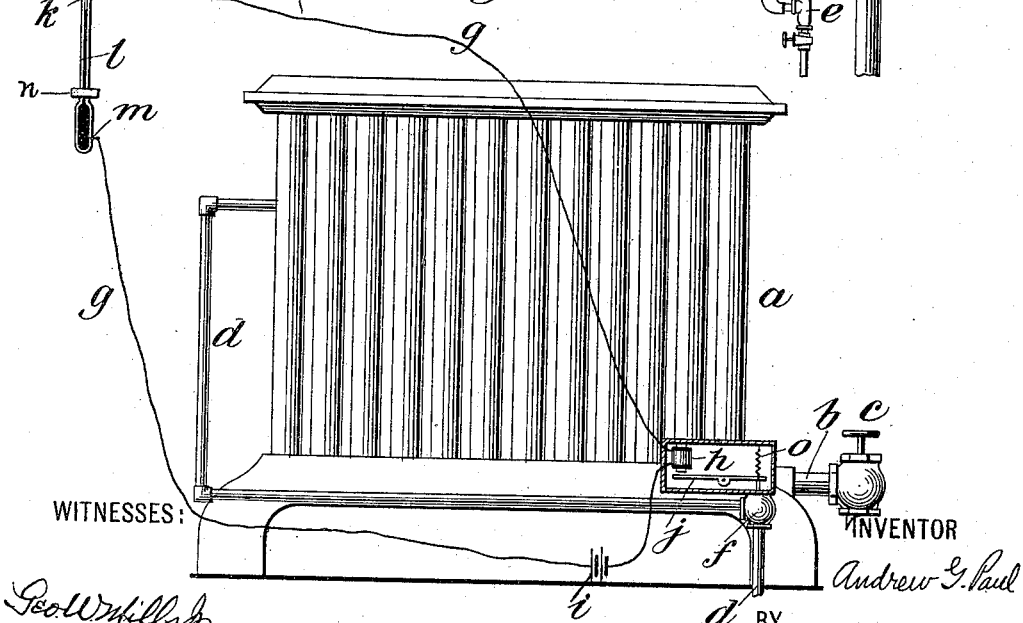

No. 647,026. Patented Apr. 10, 1900.
A. G. PAUL.
HEATING SYSTEM.
(Application filed July 6, 1897.)
(No Model.) 3 Sheets—Sheet 2.

WITNESSES:

INVENTOR
Andrew G. Paul
BY
ATTORNEYS.

No. 647,026. Patented Apr. 10, 1900.
A. G. PAUL.
HEATING SYSTEM.
(Application filed July 6, 1897.)
(No Model.) 3 Sheets—Sheet 3.

WITNESSES:
Geo W Mills Jr
Edwin Leger

INVENTOR
Andrew G. Paul
BY
Witter Kenyon
ATTORNEYS.

THE NORRIS PETERS CO., PHOTO-LITHO., WASHINGTON, D. C.

UNITED STATES PATENT OFFICE.

ANDREW G. PAUL, OF BOSTON, MASSACHUSETTS.

HEATING SYSTEM.

SPECIFICATION forming part of Letters Patent No. 647,026, dated April 10, 1900.

Application filed July 6, 1897. Serial No. 643,529. (No model.)

*To all whom it may concern:*

Be it known that I, ANDREW G. PAUL, a citizen of the United States, and a resident of Boston, in the county of Suffolk and State of Massachusetts, have invented a new and useful Improvement in Heating Systems, of which the following is a full, clear, and exact specification, reference being had to the accompanying drawings, which form a part hereof.
This invention relates to heating systems in which a suitable heating agent or vehicle, such as steam, is circulated through a system of pipes or passages leading to a suitable heater or radiator in the room or space to be heated. It applies equally well to single-pipe and double-pipe systems. Its object is to automatically and accurately control the amount of heat imparted by the system or work done thereby and in this way to regulate the temperature of the room or space that is being heated.

This invention is specially applicable to such a heating system as is shown in the drawing of United States Letters Patent No. 464,946, granted to William P. Skiffington, of December 8, 1891, in which there is an air-pipe additional to the supply and return pipe or pipes of the system and an exhauster connected with said air-pipe. In this embodiment of my invention the object is to automatically control and regulate the removal or escape of the air from the heaters or radiators, and thereby to regulate or determine the part or extent of the heaters or radiators that will be brought into operation in the work of heating, and in this way to regulate the amount of work done or heat furnished by the system.

The invention consists, broadly, in the combination, with a heater or radiator or any form of heating system, and means for controlling the same, such as a valve on the supply-pipe or on the air-pipe or any valve or other means controlling the heat imparted by the system or the work done thereby, of an electric motor for actuating the controlling means, a thermal circuit-closer adapted to be placed against some part of the heater or radiator or heating system and to be expanded by the heat from the same and to be moved away from said position when desired, a flexible electrical circuit connecting the circuit-closer and the motor, and an electric generator in the circuit, whereby the extent of the heater or radiator or system called into action can be varied and regulated and the temperature thereby controlled.

The invention also consists in the combination, with a heater or radiator or any form of heating system and a valve or other means for controlling the same, such as is referred to in the preceding paragraph, of an electric motor for actuating the valve, a thermal circuit-closer adjustably and removably attached to the heater or radiator, and thereby adapted to be placed against different parts of the heater or radiator or heating system and to be expanded by the heat from the same, a flexible electrical circuit connecting the circuit-closer and the motor, and an electric generator in the circuit, whereby the extent of the heater or radiator or system called into action, can be varied and regulated to a still greater extent and the temperature thereby accurately and nicely controlled.

The invention also consists in the combination, with a heater or radiator or any form of heating system, of an air-pipe for removing the air therefrom, a valve controlling the passage in the air-pipe, an electric motor for actuating the valve, a thermal circuit-closer, such as above described, a flexible electrical circuit connecting the circuit-closer and motor, and an electric generator in the circuit.

The invention also consists in the combination, with the parts named in the preceding paragraph, of an air-pipe additional to the supply and return pipe or pipes and an exhauster connected with said air-pipe.

The invention also consists in certain other features of construction and combinations of parts hereinafter described and claimed.

The invention is fully illustrated in the accompanying drawings, in which—

Figure 4:
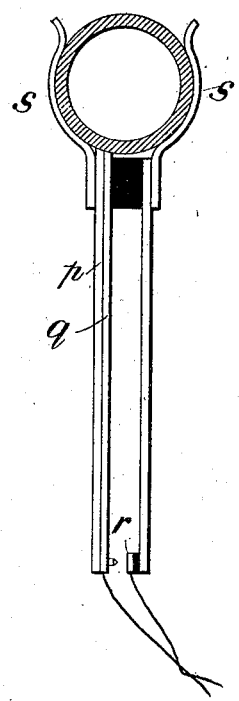
Figure 5:
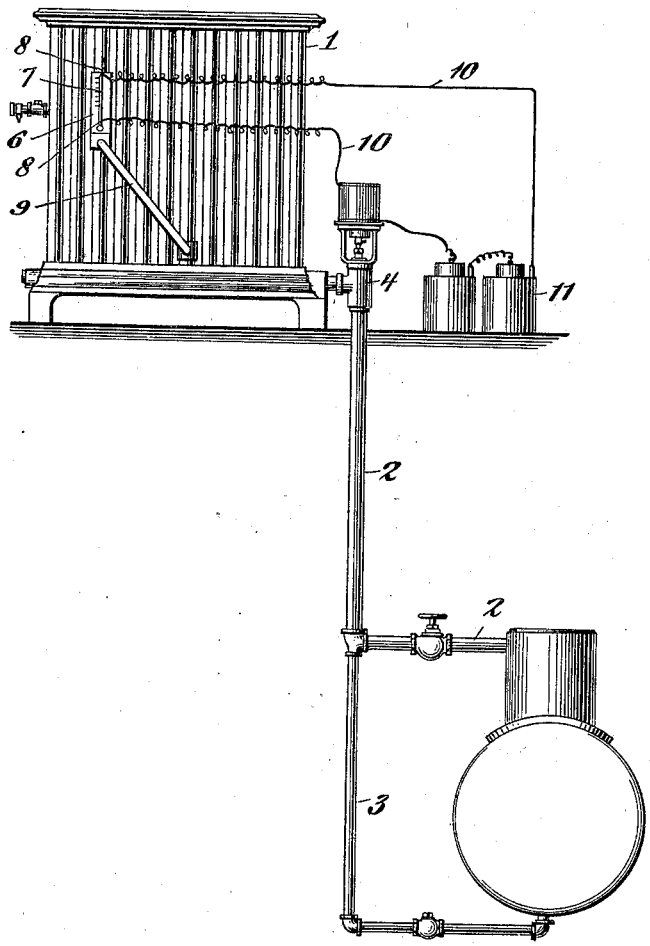
Figure 6:
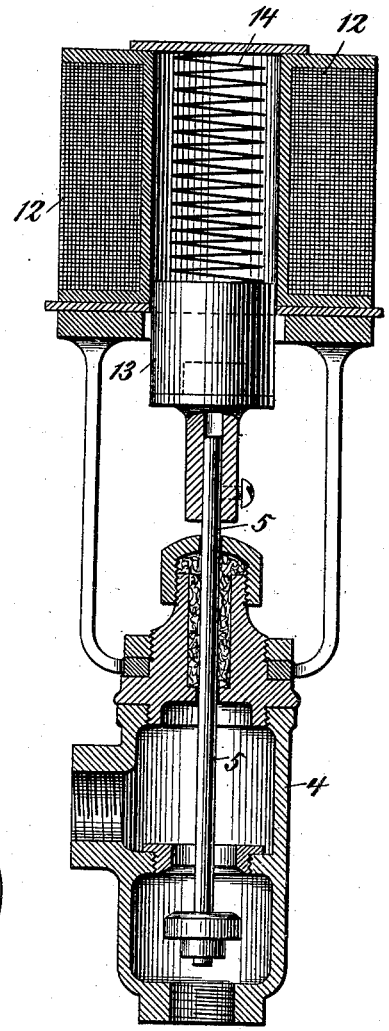

Figure 1 shows a radiator with my improvement applied thereto, the thermal circuit-closer being placed against one of the tubes of the radiator and supported in that position. Fig. 2 shows a thermal circuit-closer entirely detached from the radiator. Fig. 3 shows another form of thermal circuit-closer adapted to be applied to different parts of the heater or radiator. Fig. 4 is a detailed view of the parts shown in Fig. 3. Fig. 5 shows a radiator with a thermal circuit-closer attached thereto and supported in a different manner, the flexible electrical circuit in this case connecting the thermal circuit-closer with the valve on the supply-pipe. Fig. 6 is a sectional view of the valve on the supply-pipe shown in Fig. 5.

Referring to Fig. 1 of the drawings, $a$ is an ordinary radiator. $b$ is a pipe which serves at the same time as the supply-pipe and the return-pipe, the radiator being connected up on the single-pipe system. $c$ is an ordinary valve in the supply-pipe. $d$ is an air-pipe additional to the supply and return pipe, connected with the radiator, preferably at the upper part thereof. $e$ is an exhauster at the outer end of the air-pipe. I prefer to make this exhauster in the form of a jet of steam or water; but any other suitable device can be employed. $f$ is a valve on the air-pipe, controlling the passage in the same. $g$ is a flexible electric circuit. This circuit is connected with a suitable electric motor, which in the form represented in the drawings consists of an electromagnet $h$, which is provided with an armature $j$, pivoted at its middle point and connected at its outer end with the spindle of the valve $f$. $i$ is an electric generator of any suitable kind, such as an ordinary electric battery. $o$ is a spring which operates to hold the armature away from the magnet, and thus to hold the valve $f$ open. $k$ is a thermal circuit-closer made in the form of a thermometer, with a column of mercury $l$ and two contact-points $m\,m$. When the mercury is heated and it is thereby expanded, it makes contact with the upper contact-point $m$, and thereby closes the circuit. The thermal circuit-closer is provided with two catches or clips $n\,n$, which are adapted to be slipped on any one of the tubes of the radiator and to hold the circuit-closer firmly in position against the tube. These clips can be greatly varied in form. The electrical circuit $g$ is flexible and is preferably made of suitable wire that can be easily bent and that is covered with a suitable non-conducting envelop. The operation of this apparatus is as follows: If the operator or user desires to use only nine tubes of the radiator, he places the thermal circuit-closer against the ninth tube, as shown in Fig. 1, and fastens it in place by means of the clips. The position of the thermal circuit-closer can be easily changed and the circuit-closer can be placed in any position desired by reason of the fact that the connection between the circuit-closer and the motor is a flexible one. The steam or other heating agent is then turned on and where an exhauster is used the exhauster is started. The air, of which the radiator is full, escapes or flows out through the air-pipe and the steam enters. The extent to which the steam enters is dependent upon the extent to which the air is removed. Steam cannot flow into any part of the radiator until the air has been removed therefrom. When the steam reaches the ninth tube, that tube is heated. The circuit-closer is thereby heated and the mercury, expanding, closes the circuit. The motor is thereby operated, the armature being attracted by the magnet, and the valve is closed, thereby closing the air-pipe, the removal or escape of any more air is prevented, and the entrance of the steam beyond the ninth tube is thereby prevented. If air is given off from the steam and collects in the ninth tube, the tube is cooled, and thereby the ciruit-closer, the circuit is broken, and the armature is drawn away from the magnet by the spring $o$, and the valve $f$ is again opened. The air once more escapes until the ninth tube is filled with steam and until the air-pipe is again shut off in the manner already described. In this way the extent to which the radiator is put into operation in the work of heating is automatically regulated by the thermal circuit-closer. Any desired number of tubes can be brought into operation by placing the circuit-closer on the proper tube.

In Fig. 2 the same construction and arrangement are shown, except that the thermal circuit-closer has been wholly detached from the radiator and hung upon the wall or placed in any position that may be desired. This can be done without any difficulty or trouble by reason of the fact that the electric circuit is flexible, as already explained. The operation of this apparatus is in general the same as that already explained. The circuit-closer has been removed from the radiator to permit the entire radiator to operate until the room has reached the desired temperature. It is represented as being hung upon the wall of the room. In this position it is operated by the heat driven off from the radiator. When the temperature has been raised to the predetermined point, the circuit-closer, expanding, closes the circuit and shuts off the air-pipe. When the room has been sufficiently heated, the thermal circuit-closer can be placed against such part of the radiator as may seem proper and will operate to close the air-pipe and keep it closed until that part of the radiator has cooled. Then the air-pipe can be opened, and consequently the steam will again flow into the radiator until the part of the radiator to which the circuit-closer is applied is again heated. In this way only a part of the radiator will be kept in operation. The whole radiator will be used to heat the room at the start; but only a part of it will be employed to maintain that heat. It is apparent that the circuit-closer might be so constructed as to be capable of being applied to the radiator at only one point—for example, the middle part thereof—so as to bring or keep only one-half the radiator in operation, and of being removed from such position when desired.

In Figs. 3 and 4 a different form of thermal circuit-closer is shown, the other parts being the same. The circuit-closer is made of two strips of metal, $p$ and $q$, of different rates of expansibility, so that when they are heated the strips are bent inwardly and brought into contact with the point $r$, thereby closing the circuit. The circuit-closer is provided with a clip $s$ to enable it to be fastened to any one of the radiator-tubes.

In Figs. 5 and 6 a modification of the invention is shown in which the circuit-closer is connected by means of the flexible electrical circuit with a valve on the supply-pipe. 1 is an ordinary radiator. 2 is the supply-pipe, a part of which also serves as the return-pipe. 3 is the return-pipe, connecting the boiler with the supply-pipe. As shown, it is provided with a check-valve. 4 is the valve on the supply-pipe. 5 is the valve-stem. 6 is a thermal circuit-closer made in the form of a thermometer, as already explained, with a column of mercury 7 and two contact-points 8 8. When the mercury is heated, and thereby expanded, it makes contact with the upper contact-point 8, and thereby closes the circuit. The circuit-closer may be provided with catches or clips to slip upon the radiator-tubes. The circuit-closer is supported by the arm 9, which is pivoted to the radiator at its lower end and to the circuit-closer at its upper end. The circuit-closer can thus be swung or moved so as to be fastened against any tube of the radiator. 10 is a flexible electrical circuit made of a conductor that can be readily bent and that is preferably covered with a suitable insulating-envelop. 11 is an electric generator, such as any suitable form of battery. The electrical circuit is also connected with the electric motor for actuating the valve of the supply-pipe. The motor consists of a coil 12, of properly-insulated wire, and an armature 13, which is attached to the valve-stem 5. 14 is a spring bearing against the bridge or cross-piece at the top and against the armature 13 at the bottom. The circuit-closer is placed against the proper tube of the radiator. When it is heated, the mercury expands and closes the circuit. The armature 13 is drawn up within the coil 12 and the supply-valve is closed. When the circuit-closer is cooled, the mercury contracts and breaks the circuit and the spring 14 forces the armature 13 down and opens the supply-valve.

It will be readily understood that the different parts of my invention can be greatly varied in form.

When an air-pipe is employed without an exhauster, the removal of the air must be effected by employing pressure in the system.

The employment of a flexible electrical circuit as the means of connection between the thermal circuit-closer and the means for controlling the heater or radiator enables the thermal circuit-closer to be easily moved to any place or position and to be easily changed from one place to another. It also gives the circuit-closer a wider range of movement. Moreover, in a case like the present one, where it is intended to apply the circuit-closer directly to the radiator, the thermal circuit-closer has the special advantage that it contains no large connecting-arms or parts of metal which might come into contact with or close to other parts of the radiator, so as to be heated thereby, and might thus affect the circuit-closer and interfere with its proper operation.

The apparatus is simple and economical in construction and operation. Each radiator or the radiators in each room may be separately operated by means of some cheap form of battery, which would make it unnecessary to have an expensive system of wiring reaching throughout the entire building. No extra piping is required, as in other systems designed to regulate the operation of heaters or radiators. The work of the heater or radiator is controlled accurately and automatically.

What I claim as new, and desire to secure by Letters Patent, is—

1. The combination with a heater or radiator, and means for controlling the same, of an electric motor for actuating the controlling means, a thermal circuit-closer adapted to be placed against some part of the heater or radiator and to be expanded by the heat from the same and to be moved away from said position when desired, a flexible electrical circuit connecting the circuit-closer and the motor, and an electric generator in the circuit, substantially as set forth.

2. The combination with a heater or radiator, and a valve for controlling the same, of an electric motor for actuating the valve, a thermal circuit-closer adjustably and removably attached to the heater or radiator, a flexible electrical circuit connecting the circuit-closer and the motor, and an electric generator in the circuit, substantially as set forth.

3. The combination with a heater or radiator, of an air-pipe for removing air therefrom, a valve for controlling the passage in the air-pipe, an electric motor for actuating the valve, a thermal circuit-closer adapted to be placed against some part of the heater or radiator and to be expanded by the heat from the same and to be moved away from said position when desired, a flexible electrical circuit connecting the circuit-closer and the motor, and an electric generator in the circuit, substantially as set forth.

4. The combination with a heater or radiator, of an air-pipe for removing air therefrom additional to the supply and return pipe or pipes, a valve for controlling the passage in the air-pipe, an electric motor for actuating the valve, a thermal circuit-closer adjustably and removably attached to the heater or radiator, a flexible electrical circuit connecting the circuit-closer and the motor, and an electric generator in the circuit, substantially as set forth.

5. The combination with a heater or radiator, of an air-pipe for removing air therefrom additional to the supply and return pipe or pipes, an exhauster connected with the air-pipe, a valve for controlling the passage in the air-pipe, an electric motor for actuating the valve, a thermal circuit-closer adjustably and removably attached to the heater or radiator, a flexible electrical circuit connecting the circuit-closer and the motor, and an electric generator in the circuit, substantially as set forth.

6. The combination with a heater or radiator, of an air-pipe for removing air therefrom, a valve controlling the passage in the air-pipe, an electric motor for actuating the valve, a thermal circuit-closer comprising the expanding material $l$ and the contact-points $m\ m$, the clips $n\ n$, a flexible electrical circuit connecting the circuit-closer and the motor, and an electric generator in the circuit, substantially as set forth.

7. The combination of the radiator $a$, the supply-pipe $b$, the air-pipe $d$, the exhauster $e$, the valve $f$, the flexible circuit $g$, the electromagnet $h$, the battery $i$, the armature $j$, the spring $o$, and the thermal circuit-closer $k$ provided with the expanding member $l$, the contact-points $m\ m$, and the clips $n\ n$, substantially as set forth.

In testimony whereof I have signed my name to this specification in the presence of two subscribing witnesses.

ANDREW G. PAUL.

Witnesses:
C. E. PIERCE,
THOS. W. ANDREW.